(No Model.)
P. H. RYLANDER.
DEVICE FOR LOCKING SHAFTS IN HUBS OR COUPLINGS.
No. 597,329. Patented Jan. 11, 1898.
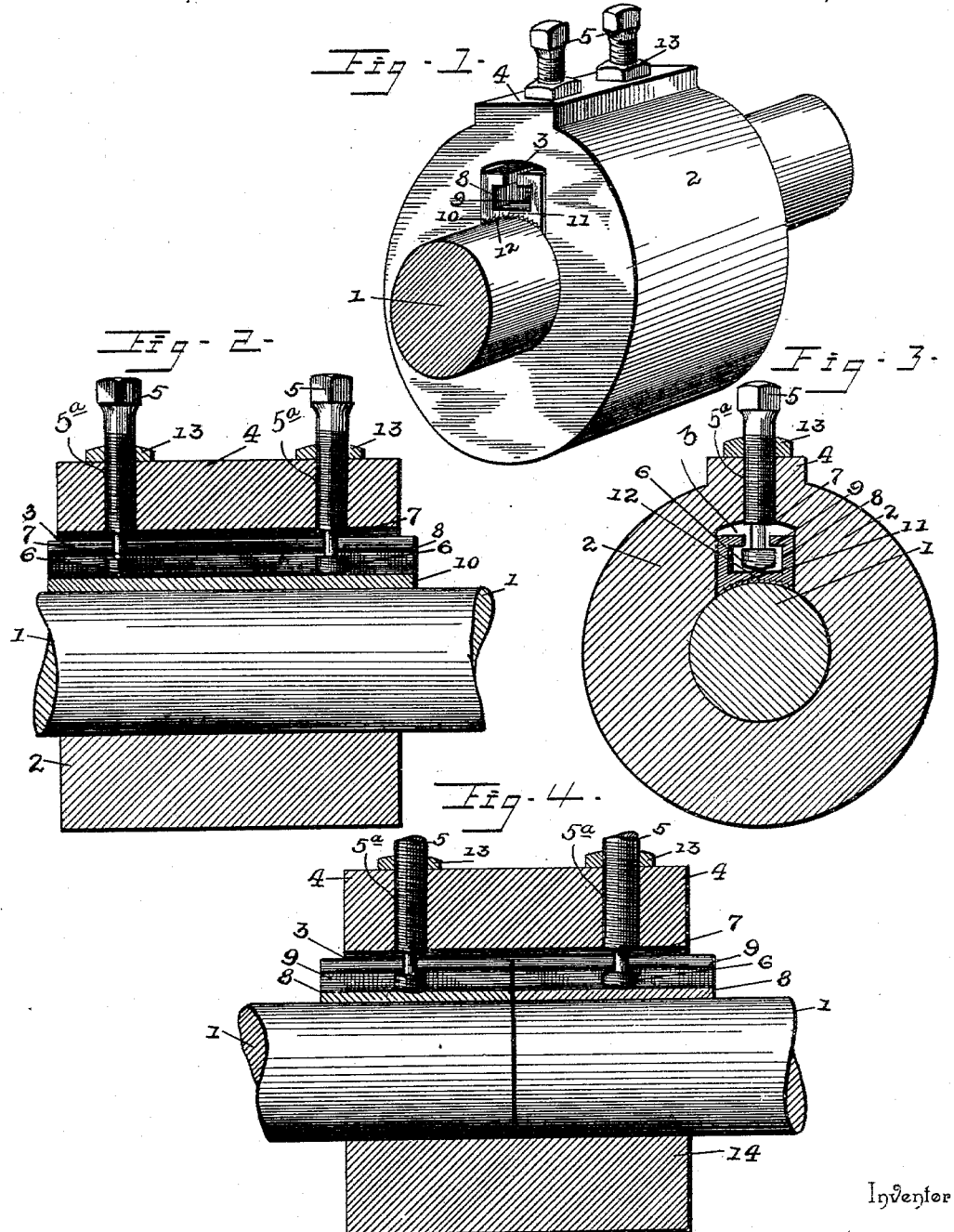
Witnesses
Inventor
Parrish H. Rylander,
By his Attorneys,

UNITED STATES PATENT OFFICE.

PARRISH H. RYLANDER, OF LOCKHART, TEXAS.

DEVICE FOR LOCKING SHAFTS IN HUBS OR COUPLINGS.

SPECIFICATION forming part of Letters Patent No. 597,329, dated January 11, 1898.

Application filed September 7, 1897. Serial No. 650,829. (No model.)

*To all whom it may concern:*

Be it known that I, PARRISH H. RYLANDER, a citizen of the United States, residing at Lockhart, in the county of Caldwell and State of Texas, have invented a new and useful Device for Locking Shafts in Hubs or Couplings, of which the following is a specification.

This invention relates to devices for locking a shaft within a tubular member, such as a pulley or wheel hub or a shaft-coupling, its object being to avoid the use of a keyway in the shaft and to provide the tubular member with a removable and reversible key having a serrated face adapted to be forced into close contact with the shaft to lock the tubular member thereon.

With these and other objects in view the invention consists of the several details of construction and combination of parts, as will be hereinafter fully described, and particularly pointed out in the claims.

In the drawings, Figure 1 is a perspective view of a pulley-hub and shaft secured together by my improved locking device. Fig. 2 is a vertical longitudinal section of the hub and shaft. Fig. 3 is a vertical transverse section. Fig. 4 is a longitudinal section of a shaft-coupling, showing the abutting ends of two sections of a shaft.

Similar reference-numerals indicate similar parts in the several figures.

Referring to Figs. 1, 2, and 3, 1 indicates a shaft, and 2 the hub of a pulley.

3 indicates a keyway formed in the hub and extended longitudinally of the bore and communicating therewith throughout its entire length.

4 indicates a boss cast on the outer face of the pulley directly over the keyway to strengthen the hub at its point to compensate for the weakening thereof caused by forming the keyway.

5 indicates set-screws working in threaded openings $5^a$, formed in the boss 4 near each end of the hub, which openings communicate with the keyway. Each set-screw is provided at its inner end with a head 6 and a neck 7, preferably formed by making an annular groove in the set-screw near its lower end.

8 indicates a key adapted to fit snugly within the keyway to have longitudinal movement therein and also a limited up-and-down movement. A T-shaped groove 9 is formed in the key and extends from end to end thereof and opens out in the upper face of the key.

Instead of a T-shaped groove it is obvious that it may be dovetailed or otherwise formed and the ends of the set-screws be correspondingly shaped, and therefore I do not intend to limit myself to a T-shaped groove, but include, as being within my invention, any other-shaped groove that will permit the key to slide longitudinally on the set-screws, but prevent their separation otherwise.

The lower face of the key is concave in cross-section to correspond to the periphery of the shaft, and a series of longitudinal knife-edged ribs 10 are formed in the lower face. Each rib has an inclined face 11 and a vertical face 12, and the faces 11 all incline in one direction, so that the ribs have the appearance of saw-teeth in cross-section. 13 indicates jam-nuts which work on the set-screws to engage the outer face of the boss 4 to lock the set-screws against accidental turning.

Referring to Fig. 4, 14 indicates a shaft-coupling fitted over the abutting ends of two sections of a shaft, and this coupling is provided with a keyway and a reinforcing-boss, the same as in the hub already described. The construction is similar in all respects except that instead of one key being used two separate keys must be employed, one for each of the shaft-sections, and these keys must be reversely arranged—that is, the ribs on the sections must incline in opposite directions, as will be readily understood.

In applying the locking device, if the shaft be driven, the key must be so arranged that the ribs will incline in a direction opposite to that in which the shaft is moved, and if the pulley be driven the ribs on the key must incline in a direction opposite to that in which the pulley is driven, and should it be necessary to reverse the direction of movement of the shaft or the pulley, by loosening the set-screws the key can be easily slid out of the keyway longitudinally, reversed, and again inserted and caused to bear upon the shaft by tightening up the set-screws. The inner head of each set-screw will fit sufficiently loose in the groove in the key to permit the latter to slide freely on the heads when it is released from tight engagement with the shaft. It is also obvious that by loosening the set-screws the key can be moved up in the keyway sufficiently to take it entirely out of engagement with the shaft, and the pulley can then turn on the shaft or the shaft can be turned within the pulley without one affecting the other.

It will be understood that changes in the form, proportion, and the minor details of construction may be resorted to without departing from the spirit or sacrificing any of the advantages of this invention.

Having thus described the invention, what I claim is—

1. The combination with a shaft, of a tubular member fitted on the shaft, said tubular member having a longitudinal keyway formed therein, a key removably fitted in the keyway and having inclined ribs on its lower face to engage the shaft, and an undercut groove in its upper face extending longitudinally thereof and open at both ends, and set-screws fitted in said tubular member and having heads of a shape corresponding to the shape of the groove to fit loosely therein, substantially as described.

2. The combination with a shaft, of a tubular member fitted on the shaft, said tubular member having a longitudinal keyway formed therein, and a reinforcing-boss on its outer face above the keyway, a key removably fitted in the keyway and having its lower face concaved, and a series of inclined knife-edged ribs formed thereon, said key having also an undercut groove in its upper face extending longitudinally thereof and open at both ends, and set-screws working in said boss and having heads shaped to correspond with the shape of the groove in the key and fitting loosely therein, substantially as described.

3. The combination with the abutting ends of two sections of a shaft, of a tubular member fitted over said abutting ends and having a keyway formed therein, two keys removably fitted in the keyway to respectively engage the two shaft-sections, each key having inclined ribs on its lower face, the ribs on one key being inclined oppositely to those on the other key, and each key having also an undercut groove in its upper face extending longitudinally thereof and open at both ends, and a series of set-screws fitted in the tubular member and having heads shaped to correspond with the grooves in the keyways and into which they loosely fit, substantially as described.

In testimony that I claim the foregoing as my own I have hereto affixed my signature in the presence of two witnesses.

PARRISH H. RYLANDER.

Witnesses:
E. L. BOWDEN,
M. S. CLARK.